United States Patent
Schulenberg

(10) Patent No.: US 11,296,576 B2
(45) Date of Patent: Apr. 5, 2022

(54) HORIZONTAL SHAFT ELECTRIC POWERHEAD

(71) Applicant: Briggs & Stratton, LLC, Wauwatosa, WI (US)

(72) Inventor: David Schulenberg, Sussex, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 256 days.

(21) Appl. No.: 16/492,077

(22) PCT Filed: Mar. 8, 2018

(86) PCT No.: PCT/US2018/021584
§ 371 (c)(1),
(2) Date: Sep. 6, 2019

(87) PCT Pub. No.: WO2018/165453
PCT Pub. Date: Sep. 13, 2018

(65) Prior Publication Data
US 2021/0281146 A1 Sep. 9, 2021

Related U.S. Application Data

(60) Provisional application No. 62/469,472, filed on Mar. 9, 2017.

(51) Int. Cl.
*H02K 7/00* (2006.01)
*H02K 5/22* (2006.01)
(Continued)

(52) U.S. Cl.
CPC .............. *H02K 7/003* (2013.01); *H02K 5/22* (2013.01); *H02K 11/0094* (2013.01); *E01H 5/098* (2013.01)

(58) Field of Classification Search
CPC ...... H02K 7/003; H02K 11/0094; H02K 5/22; E01H 5/098
See application file for complete search history.

(56) References Cited

U.S. PATENT DOCUMENTS 2,478,829 A   8/1949   Lechtenberg
2,930,322 A   3/1960   Spencer
(Continued)

OTHER PUBLICATIONS https://cdn.powerequipment.honda.com/engines/pdf/manuals/31ZH7600.pdf Honda Motor Company; Copyright 1990 Honda GX120 and GX160 owners manual. Relevant p. 33 Online PDF. (Year: 1990).*

(Continued)

*Primary Examiner* — Tulsidas C Patel
*Assistant Examiner* — Riley Owen Stout
(74) *Attorney, Agent, or Firm* — Foley & Lardner LLP

(57) ABSTRACT

An electric powerhead includes a housing including a mounting plate including a shaft opening and a plurality of first openings arranged in a standard horizontal shaft engine mounting pattern. The housing also includes a base including a plurality of second openings arranged in a standard horizontal shaft engine support pattern. The electric powerhead further includes an electric motor positioned within the housing, where the electric motor includes an output shaft that extends through the shaft opening of the mounting plate and where the output shaft is configured to rotate about an axis of rotation.

18 Claims, 7 Drawing Sheets

(51) Int. Cl.
*H02K 11/00* (2016.01)
*E01H 5/09* (2006.01)

(56) References Cited

U.S. PATENT DOCUMENTS

| | | |
|---|---|---|
| 5,787,693 A | 8/1998 | Dyke |
| 2008/0038073 A1 | 2/2008 | Paolicelli |
| 2011/0094129 A1* | 4/2011 | Rowe ................... E01H 5/045 37/246 |

OTHER PUBLICATIONS

International Search Report and Written Opinion, PCT/US2018/021584, Briggs & Stratton Corporation (May 14, 2018).

* cited by examiner

HORIZONTAL SHAFT ELECTRIC POWERHEAD

CROSS-REFERENCE TO RELATED APPLICATIONS

This application is a National Stage Application of PCT/US2018/021584, filed Mar. 8, 2018, which claims the benefit of U.S. Provisional Application No. 62/469,472, filed Mar. 9, 2017, both of which are incorporated herein by reference in their entireties.

BACKGROUND

The present invention generally relates to prime movers for outdoor power equipment. More specifically, the present invention relates to an electric power head and energy storage device for driving and/or powering various components of a piece of outdoor power equipment.

SUMMARY

One embodiment of the invention relates to an electric powerhead including a housing with a mounting plate including a shaft opening and a multiple first openings arranged in a standard horizontal shaft engine mounting pattern, a base including multiple second openings arranged in a standard horizontal shaft engine support pattern, and an electric motor positioned within the housing, wherein the electric motor includes an output shaft that extends through the shaft opening of the mounting plate and wherein the output shaft is configured to rotate about an axis of rotation.

Another embodiment of the invention relates to outdoor power equipment including an electric powerhead including a housing with a mounting plate including a shaft opening and multiple first openings arranged in a standard horizontal shaft engine mounting pattern, a base including multiple second openings arranged in a standard horizontal shaft engine support pattern, a battery receptacle, an electric motor positioned within the housing, wherein the electric motor includes an output shaft that extends through the shaft opening of the mounting plate and wherein the output shaft is configured to rotate about an axis of rotation, and a battery configured to be removably attached to the battery receptacle to provide electricity to the electric motor.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
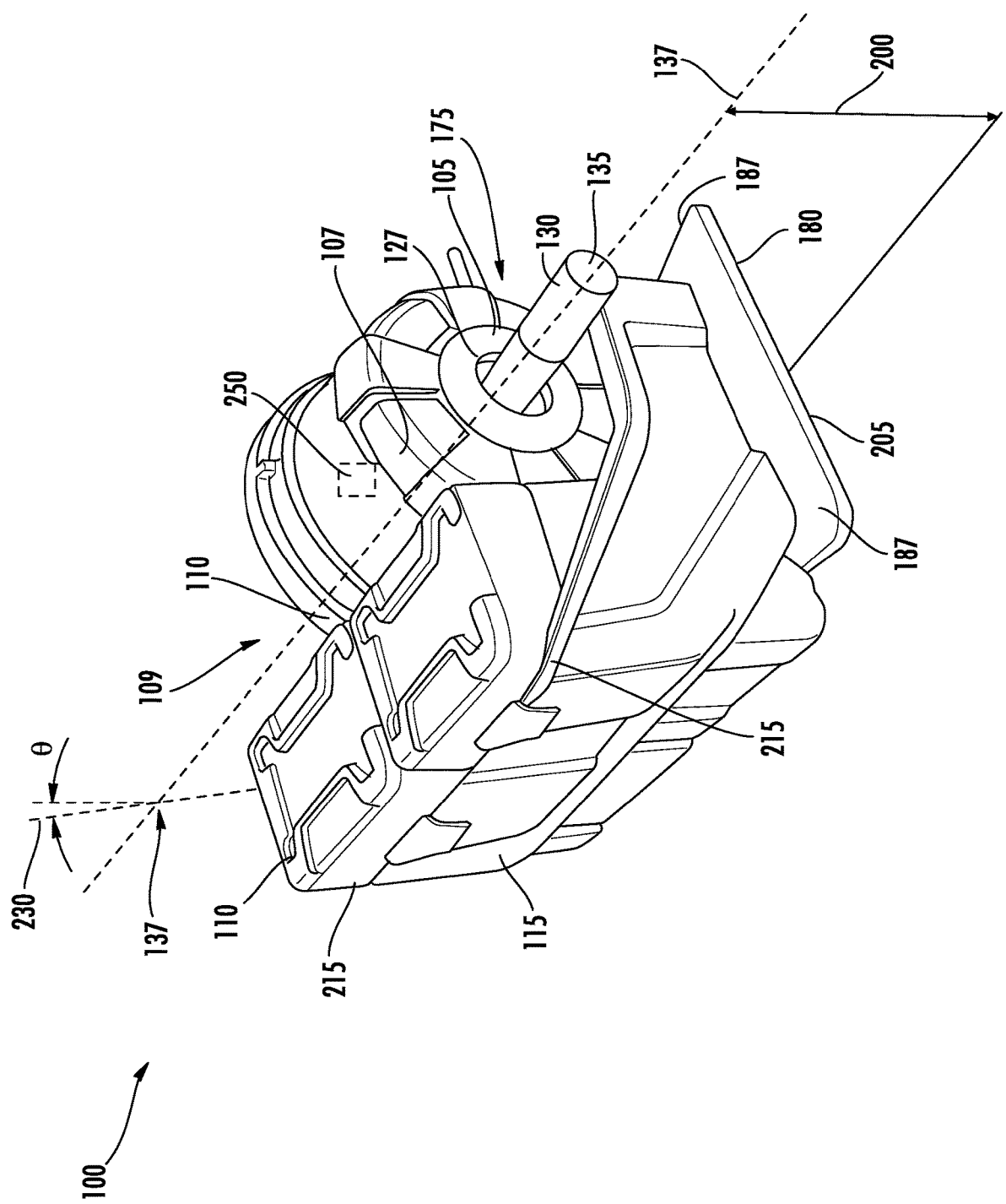
FIG. 1 is a perspective view of an electric powerhead, according to an exemplary embodiment.

FIG. 1 illustrates an electric powerhead 100 according an exemplary embodiment. The electric powerhead 100 includes an electric motor 105 and an energy storage device or battery 110 that powers the electric motor 105 and other electrical components. The electric powerhead 100 serves as a replacement for a small internal combustion engine of the type frequently used on a variety of equipment, including outdoor power equipment and portable jobsite equipment. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Outdoor power equipment may, for example, use the electric powerhead 100 to drive an implement, such as a rotary blade of a lawn mower, a pump of a pressure washer, an auger of a snow thrower, and/or a drivetrain of the outdoor power equipment. Portable jobsite equipment includes portable light towers, mobile industrial heaters, and portable light stands.

Figure 2:
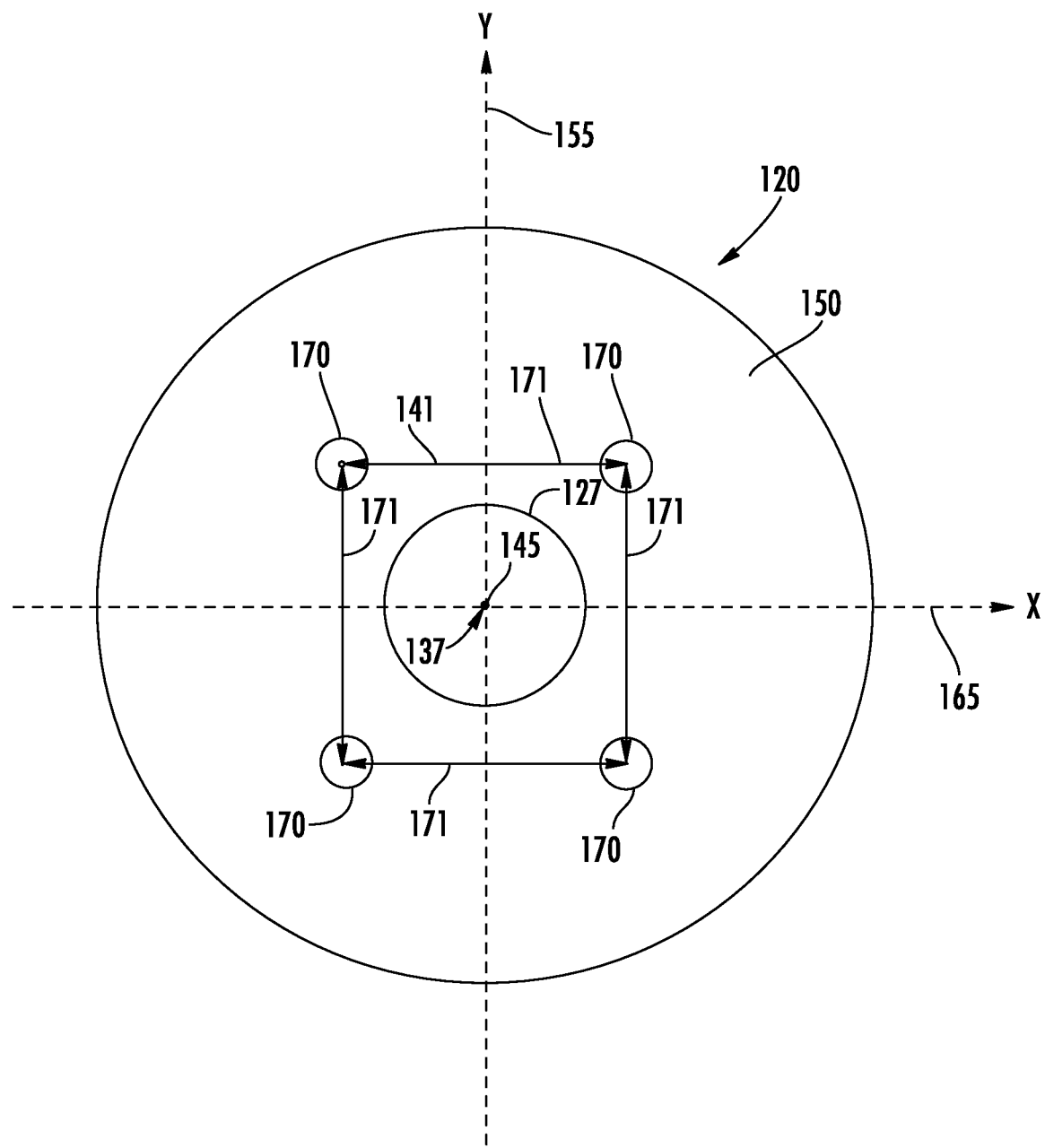
FIG. 2 is a top view of a power take-off mounting plate for use with the electric powerhead of FIG. 1, according to an exemplary embodiment.

The electric powerhead 100 also includes a housing 115 with a base 180 and a power take-off (PTO) mounting plate 120 (FIG. 2) for securing the electric powerhead 100 to a mounting location on a piece of equipment (e.g., to secure the electric powerhead 100 to the platform of a snow thrower). The housing 115 is sized so that the electric powerhead 100 has substantially the same volume as a comparable small internal combustion engine that provides a similar mechanical output (e.g., power and torque) so that the electric powerhead 100 can be used as a direct replacement for comparable small internal combustion engines. The electric powerhead 100 provides a maximum output of approximately 5.5 horsepower (HP). In other embodiments, the electric powerhead 100 provides a maximum output of approximately 5.8 HP. In other embodiments, the electric powerhead 100 provides more or less maximum output. Standard small internal combustion engines having a similar output have standard dimensions including a standard height, a standard width, a standard depth, and a standard cross-sectional area or footprint (width times depth). For example, for comparable standard small internal combustion engines, the standard depth is approximately 12.2 inches (312 millimeters (mm)), the standard width is approximately 14.3 inches (362 mm), and the standard height is approximately 13.6 inches (346 mm), with a cross-sectional area of approximately 174.5 inches squared ($1.13 \times 10^5$ mm$^2$) and a volume of approximately 2372.7 cubic inches ($3.91 \times 10^7$ mm$^3$). A distance, area, or volume is "substantially the same" as one of the standard distances, areas, or volumes of a comparable standard small engine when such a distance, area, or volume allows another component having such a distance, area, or volume to be readily used in place of the standard small engine. In some embodiments of the present invention, plus or minus 15% of the distance, area, or volume is the outer limit for a distance, area, or volume to be considered "substantially the same" as one of the standard distances, areas, or volumes.

As another example, for comparable standard small internal combustion engines, the standard depth is approximately 11.7 inches (297 mm), the standard width is approximately 13.6 inches (346 mm), and the standard height is approximately 13.0 inches (329 mm), with a cross-sectional area of approximately 159.1 inches squared ($1.12 \times 10^5$ mm$^2$) and a volume of approximately 2068.6 cubic inches ($3.38 \times 10^7$ mm$^3$).

As yet another example, for comparable standard small internal combustion engines, the standard depth is approximately 12.6 inches (321 mm), the standard width is approximately 14.8 inches (376 mm), and the standard height is approximately 13.6 inches (346 mm), with a cross-sectional area of approximately 186.5 inches squared ($1.21 \times 10^5$ mm$^2$) and a volume of approximately 2536.1 cubic inches ($4.18 \times 10^7$ mm$^3$).

The PTO mounting plate 120 includes a set of openings arranged in a standard horizontal shaft engine mounting pattern (e.g., an SAE or other industry standard for mounting small internal combustion engines). Engine mounting patterns are standardized so that engines produced by different engine manufactures can be mounted to equipment produced by different original equipment manufacturers (OEMs) without having to customize the mounting arrangement between the engine and the equipment. This allows an OEM to offer the same equipment with different engines from different manufacturers to meet the OEM's engine needs or the customer's engine needs. Bolts or other fasteners are inserted through the openings to attach the PTO mounting plate 120 at a desired mounting location. In other embodiments, the PTO mounting plate 120 includes two or more sets of openings with each set arranged in a standard engine mounting pattern. In the illustrated embodiment, the set of openings 170 has four openings 170. The four openings 170 are arranged in a square centered at the origin 145 and spaced apart from each other by a distance 171. In some embodiments, the openings 170 have a diameter of approximately 0.3125 inches and the distance 171 is approximately 2.56 inches. In other embodiments, the openings 170 have a diameter of approximately 0.315 inches (8 mm).

Figure 3:
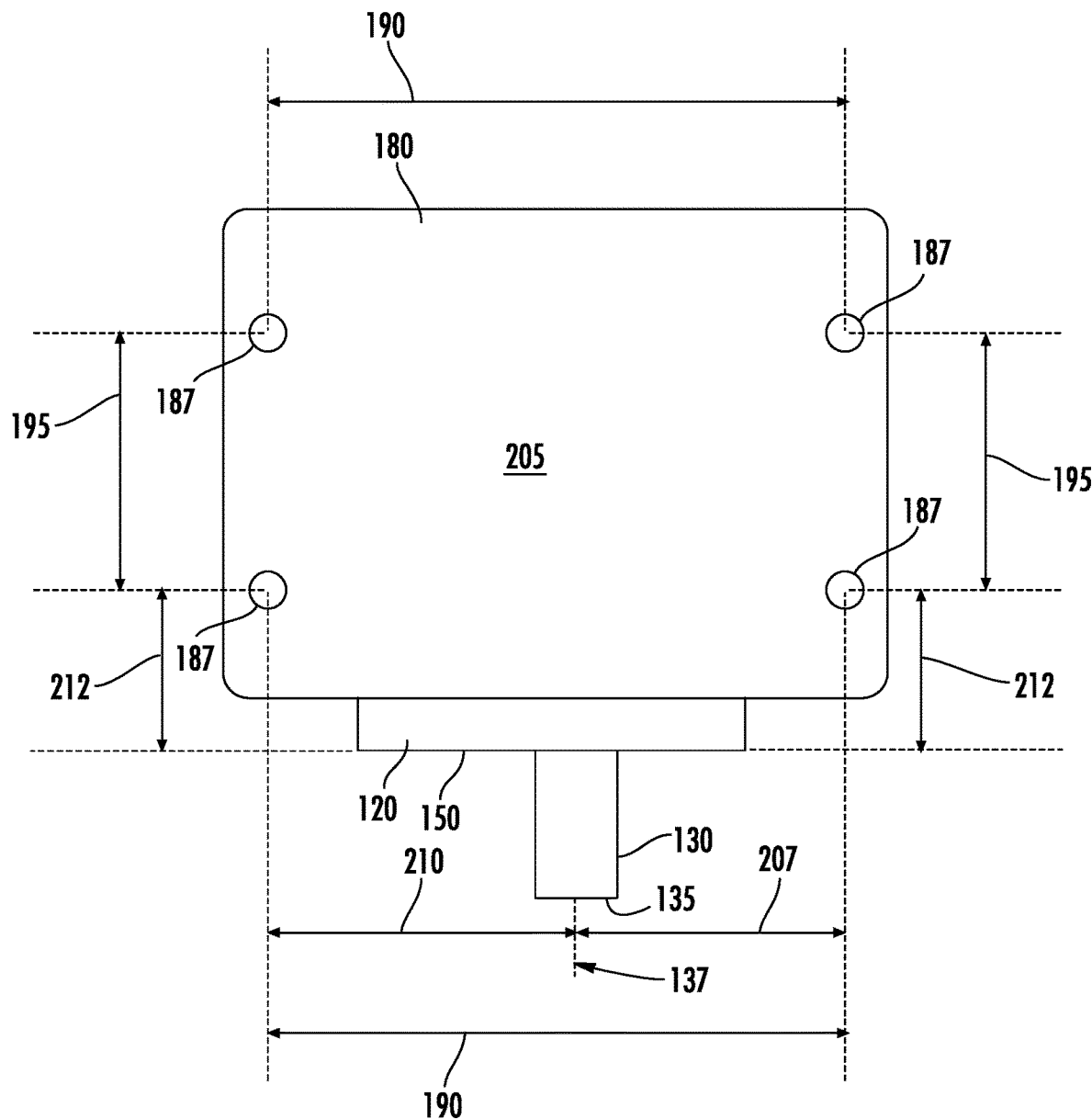
FIG. 3 is a bottom view of a base of the electric powerhead of FIG. 1, according to an exemplary embodiment.
Figure 4:
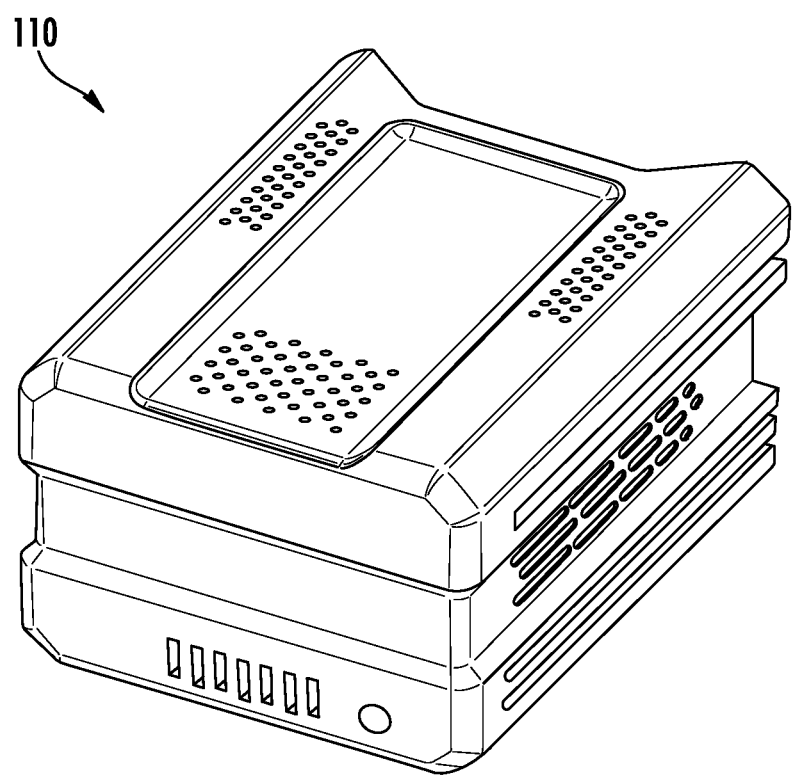
FIG. 4 is a perspective view of a battery of the electric powerhead of FIG. 1, according to an exemplary embodiment.

As shown in FIG. 3, the base 180 includes a set of openings 187 arranged in a standard horizontal engine support pattern. Bolts or other fasteners are inserted through the openings 187 to attach the base 180 at a desired mounting location. Like the engine mounting patterns discussed above, horizontal engine support patterns are standardized. In the illustrated embodiment, the set of openings 187 includes four openings 187 arranged in a rectangle having a first distance or width 190 between the center points of two openings 187 and a second distance or depth 195 between the center points of two openings 187. In some embodiments, the width 190 is 6.38 inches and the depth 195 is 3.12 inches. In some embodiments, some or all of the openings 187 have a diameter of 0.35 inch. In some embodiments, the front openings 187 (i.e., those closest to the outer surface 150 of the mounting plate 120) are elongated slots. In some embodiments, the elongated slots have a diameter of 0.35 inch and a length of 0.55 inch. In some embodiments, the height 200 is 4.17 inches (shown in FIG. 1), the distance 207 is 2.60 inches, and the distance 210 is 3.78 inches. The center points of the front openings 187 in the base 180 (i.e., those closest to the outer surface 150 of the mounting plate 120) are spaced a distance 212 from the outer surface 150 of the mounting plate 120. In some embodiments, the distance 212 is 1.40 inches. Like the engine mounting patterns and support patterns, discussed above, the height of the axis of rotation of the output shaft of a horizontal shaft engine above a mounting surface, the location of the axis of rotation relative to the supporting pattern, and the location of the supporting pattern relative to the mounting plate are standardized.

In some embodiments, the PTO mounting plate 120 and/or base 180 are molded over a metallic insert. The PTO mounting plate 120 and base 180 are made from molded plastic and the insert is made from an aluminum material. In other embodiments, the PTO mounting plate 120, base 180, and insert are made from other materials. The insert includes a ring-shaped portion and a set of bosses or protrusions extending outward from the outer surface of the ring-shaped portion. In other embodiments, the insert includes a rectangular-shaped portion with a set of bosses or protrusions extending therefrom. The insert includes a set of openings including four openings that align concentrically with the set of openings 170, 187 on the PTO mounting plate 120 and base 180, respectively. Each opening on the insert extends through the center of a protrusion. The openings of the insert are smaller in diameter than the openings 170, 187 of the PTO mounting plate 120 and base 180 such that the protrusions extend through and are approximately flush with the outer surfaces of the PTO mounting plate 120 and base 180. Accordingly, bolts or other fasteners that are used to mount the engine powerhead 100 to a piece of outdoor power equipment extend through the openings in the insert and PTO mounting plate 120 and/or base 180 and engage with (e.g., clamp against) the surfaces of the insert protrusions instead of engaging with the PTO mounting plate 120 and/or base 180. As such, when mounting the engine powerhead 100 to a piece of equipment, fasteners are engaged with the metallic material of the insert and not against the plastic material of the PTO mounting plate 120 and/or base 180. By fastening a metallic fastener against the metallic material of the insert, loosening of fasteners over time due to thermal changes and deformation of the plastic material is avoided.

Referring back to FIG. 1, the housing 115 includes a battery receptacle 215 configured to receive a removable battery 110. The removable battery 110 is able to be attached to and removed from the battery receptacle 215 without the use of tools. In other embodiments, the battery 110 may be attached to the housing 115 in a fixed manner that would require the use of tools to remove the battery 110 from the housing. The battery receptacle 215 and the battery 110 include contacts that are configured to engage or connect with each other to complete an electrical circuit when the battery 110 is attached to the battery receptacle 215. This allows the battery 110 to provide electricity to the electric motor 105 and other electrical components as will be explained in more detail below. The battery 110 includes multiple electrochemical battery cells. According to an exemplary embodiment, each cell is a cylindrical lithium ion (Li-ion) cell that extends along a longitudinal cell axis. In other embodiments, the cells may be differently shaped (e.g., prismatic cells) or may have different battery chemistries (e.g., nickel-cadmium, lead-acid, nickel metal hydride, nickel-zinc, etc.). The battery 110 may be provided in different configurations providing different energy capacities and voltage ratings. For example, in some embodiments the battery 110 provides between 150 and 500 watt hours of energy at a voltage rating of 82 volts. In other embodiments, different energy capacities and voltage ratings are provided. In some embodiments, multiple batteries 110 and battery receptacles 215 are provided to increase the amount of electrical energy available for use by the electric powerhead 100.

The battery receptacle 215 is positioned in the housing 115 so that a straight axis of insertion 230 along which the battery 110 is inserted into the battery receptacle 215 is positioned at an angle θ relative to the axis of rotation 137 of the output shaft 130 in a vertical plane that includes the axis of rotation 137. The battery receptacle 215 includes a stop surface that is configured to contact a face or other surface of the battery 110 when the battery 110 is inserted into the battery receptacle 215 to limit the insertion of the battery 110 into the battery receptacle 215. In some embodiments, the axis of insertion 230 is orthogonal to the stop surface of the battery receptacle 215. In some embodiments, when the battery 110 is attached to the battery receptacle 215, the longitudinal axes of the battery cells of the battery 110 are parallel to the axis of insertion 230.

As illustrated in FIG. 1, the battery 110 and battery receptacle 215 are positioned proximate the top portion 107 of the housing 115. As such, the battery 110 is positioned in substantially the same location as a fuel fill on a comparable small internal combustion engine. In other embodiments, the battery 110 and battery receptacle 215 are positioned proximate the rear portion 109 of the housing 115. In this way, the battery 110 is positioned in substantially the same location as a recoil cover on a comparable small internal combustion engine. In each of the embodiments described, the battery 110 is readily accessible to a user on the top or rear portions 107, 109 of the housing 115 so that the user can insert and remove the battery 110 without removing the electric powerhead 100 from a mounted position on a piece of outdoor power equipment (e.g., the snow thrower shown in FIG. 7). By positioning the battery 110 in locations common for positioning either a fuel fill (fuel tank) or a recoil starter, no customizing is needed on equipment from various OEMs because the OEM shrouding on various equipment includes existing access to those location points. This allows the electric powerhead 100 to be used as a direct replacement for a small internal combustion engine used on various equipment produced by different OEMs without the need for retooling.

In some embodiments, the battery 110 and the battery receptacle 215 include mechanical aligning features to ensure proper alignment between the battery 110 and the battery receptacle 215 and/or to guide the battery 110 into the battery receptacle 215. For example, the battery 110 includes a protrusion and the battery receptacle 215 includes a corresponding slot to receive the protrusion. As shown in FIG. 1, in some embodiments, the housing 115 includes a battery cover to secure the battery 110 to the battery receptacle 215. The battery 110 may be removed and attached to a charging station to charge the battery 110. The charging station connects to a source of electricity (e.g., the power grid, a generator, etc.) and may include a transformer. Alternatively or additionally, the battery 110 or the housing 115 includes an outlet or port to connect to a charging device. The charging device includes a plug and a cord to connect the outlet to a source of electricity (e.g., the power grid, a generator, etc.) and may include a transformer.

The electric motor 105 is positioned within the housing 115. The electric motor 105 may be directly supported by the housing 115 or supported by a cradle or other support structure located within the housing 115. In different embodiments, the electric motor 105 is provided with different power ratings (e.g. 1,500 watts, 2,500 watts, or 3,500 watts). In addition to the output shaft 130, the electric motor 105 includes a stator and a rotor. The rotor and the output shaft 130 rotate about the axis of rotation 137 when the electric motor 105 is activated. In some embodiments, a fan is coupled to the rotor and rotates to cause cooling air to pass over the electric motor 105 when activated.

In some embodiments, an intake air filter is provided upstream of a motor intake air vent 175 to limit the intake of debris into the housing 115 with the intake of air through the vent 175. In some embodiments, the intake air filter includes a housing and a filter cartridge removably inserted into or attached to the housing 115. The filter cartridge includes filter media for filtering the air flow through the intake air filter. In some embodiments, the housing and/or the filter cartridge are arranged to provide cyclonic filters before filtering by the filter media by inducing a cyclonic airflow to remove debris from the airflow. The filter media is made of a washable material, such as a nylon or plastic mesh material. The filter media may have an Ingress Protection Rating of IP-67 (indicating waterproof and dust resistance). In other embodiments, the filter media is made of paper. In some embodiments, the electric motor 105 drives the fan used to draw air into a motor intake air vent 175 in an opposite direction to clear debris from the motor intake air vent 175 and/or the intake air filter.

Figure 5:
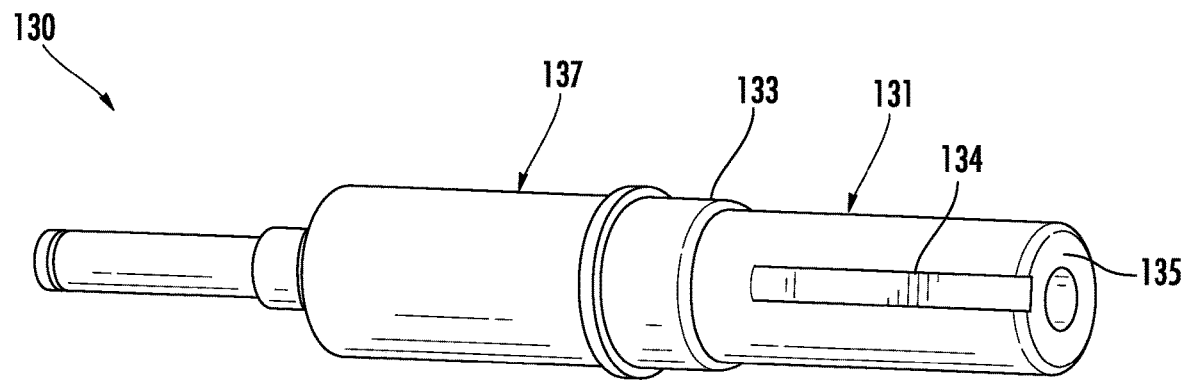
FIG. 5 is a perspective view of an output shaft of the electric powerhead of FIG. 1, according to an exemplary embodiment.
Figure 6:
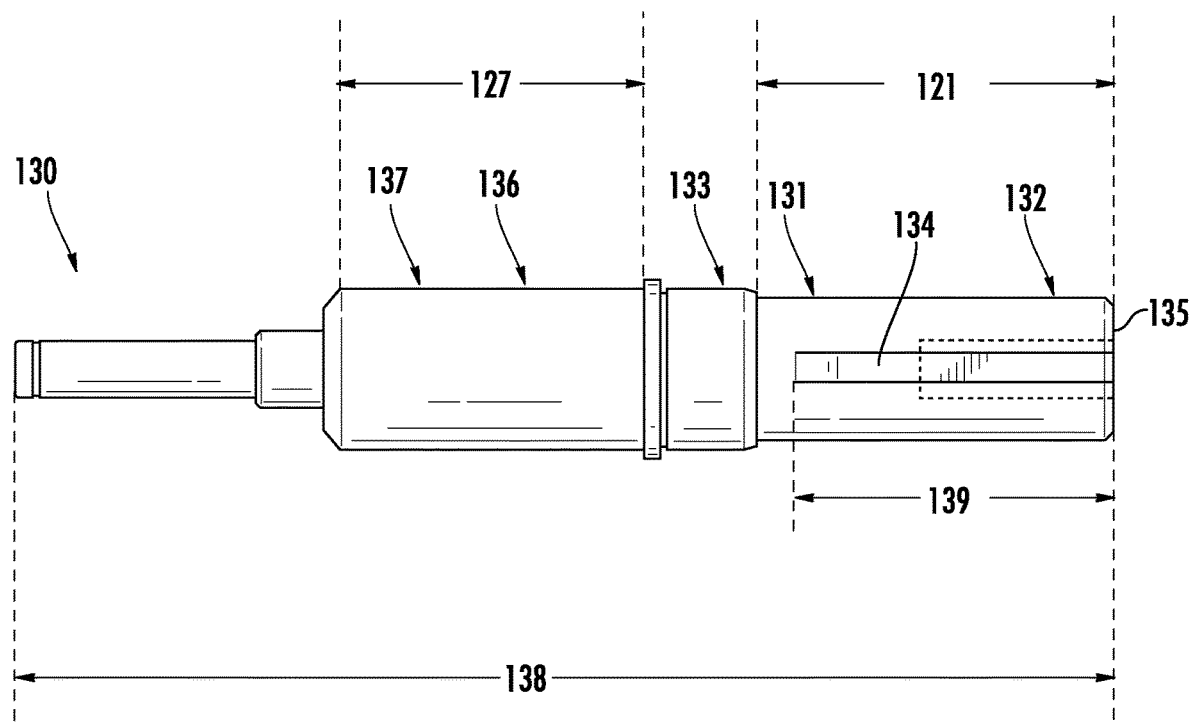
FIG. 6 is a front view of the output shaft of FIG. 5, according to an exemplary embodiment.

As shown in FIGS. 5-6, the output shaft 130 includes a first diameter 132 extending along a first portion 131 for a first length 121, a second diameter 136 extending along a second portion 137 for a second length 125, and an overall length 138. The first diameter 132 is smaller than the second diameter 136, with a step 133 positioned between the first and second diameters 132, 136. In other embodiments, the first diameter 132 is larger than the second diameter 136. In other embodiments, the first diameter 132 and second diameter 136 are the same. A keyway 134 extends from the end 135 along the first portion 131 for a length 139. The output shaft 130 is dimensionally similar to existing engine output shafts such that the output shaft 130 can be used across a wide variety of applications already using the existing engines. For example, in one embodiment, the output shaft 130 has a first diameter 132 of approximately 0.75 inches (19.05 mm). In another embodiment, the first diameter 132 is approximately 0.79 inches (20 mm). In another embodiment, the first diameter 132 is approximately 0.71 inches (18 mm). In one embodiment, the first length 121 is approximately 2.303 inches (58.5 mm). In another embodiment, the first length 121 is approximately 1.969 inches (50 mm). In other embodiments, the first length 121 can be shorter or longer in length and the first diameter 132 can be larger or smaller. With such dimensions, OEMs can use the output shaft 130 of the electric powerhead 100 without need for custom fitting or accessories to couple the output shaft 130 to existing equipment.

The electric powerhead 100 also includes a controller or processing circuit 250 for controlling operation of electrical components of the powerhead 100. In some embodiments, the controller 250 also controls operation of and/or communicates with electrical components coupled to the electric powerhead 100 (e.g., electrically coupled by wires or wirelessly coupled). The controller 250 can include a processor and memory device. The processor can be implemented as a general purpose processor, an application specific integrated circuit (ASIC), one or more field programmable gate arrays (FPGAs), a group of processing components, or other suitable electronic processing components. The memory device (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device may be or include volatile memory or non-volatile memory. The memory device may include database components, object code components, script components, or any other type of information structure for supporting the various activities and information structures described in the present application. According to an exemplary embodiment, the memory device is communicably connected to the processor via a processing circuit and includes computer code for executing (e.g., by processing circuit and/or processor) one or more processes described herein. The controller 250 may be positioned in and/or attached to the housing 115.

In some embodiments, an accessory interface is electrically coupled to the controller 250 to provide data communications (e.g., transmission and receipt of input and output signals or other data streams) with external electrical components via a communication port. In some embodiments, the accessory interface includes one or more power ports or contacts and communication ports or contacts. In some embodiments, the accessory interface includes a wireless transceiver to provide for wireless communication with an external electrical component. In some embodiments, a communication port can be used to allow an OEM or service provider to send controller programming updates (e.g., firmware updates, software updates) to the controller 250. In some embodiments, the controller 250 is programmed to detect the type of equipment the electric powerhead 100 is being used with. For example, the controller 250 can be programmed to detect equipment-specific external electrical components (e.g., plug-and-play components) and adjust operating characteristics of the electric powerhead 100 according to instructions specific to that equipment. For example, the controller 250 could detect walk behind lawn mower user controls connected to the accessory interface and limit the rotational speed of the electric motor 105 to 3200 revolutions per minute (RPM) and could detect pressure washer user controls connected to the accessory interface and limit the rotational speed of the electric motor 105 to 3600 RPM.

In some embodiments, the one or more power ports or contacts provide electricity to remote user controls (e.g., hand controls 370 described further herein). When a remote user control is plugged into the power port, the controller 250 is configured to detect the presence of the remote user control. Upon detection of the remote user control plugged into the power port, the controller 250 allows the remote user control to override any on-board control. Thus, when a remote user control is not plugged into the power port, a user can control the powerhead 100 using on-board controls. As noted above, the controller 250 can perform other functions upon detection of the remote user controls, such as limiting the rotational speed of the electric motor 105.

In various contemplated embodiments, different hierarchies of controls can be used. First, the remote user controls can be given preference over the on-board controls such that the remote user controls override inputs to the on-board controls. Second, the on-board controls can be given preference over the remote user controls such that the on-board controls override the remote user controls. Third, if the remote user controls are present (e.g., detected) the on-board controls are disabled. Fourth, in some embodiments, the powerhead 100 off control always turns the powerhead 100 off without regard to where off control is located (e.g., remotely, on-board).

In some embodiments, the electric powerhead 100 includes a speaker and a wireless transceiver (e.g., Bluetooth) to communicate with a user device (e.g., smart phone, tablet, laptop, or other smart device) to play audio over the speaker. This enables the user to use the electric powerhead as a wireless radio or speaker.

In some cold weather embodiments, it may be useful to warm up the cells of the battery 110 before using the battery 110 to power the electric motor 105 or external electrical components. A warm-up system or circuit is provided so that cells of the battery 110 discharge for a period of time to warm up the cells before the electric motor 105 or other external electrical components are activated.

Figure 7:
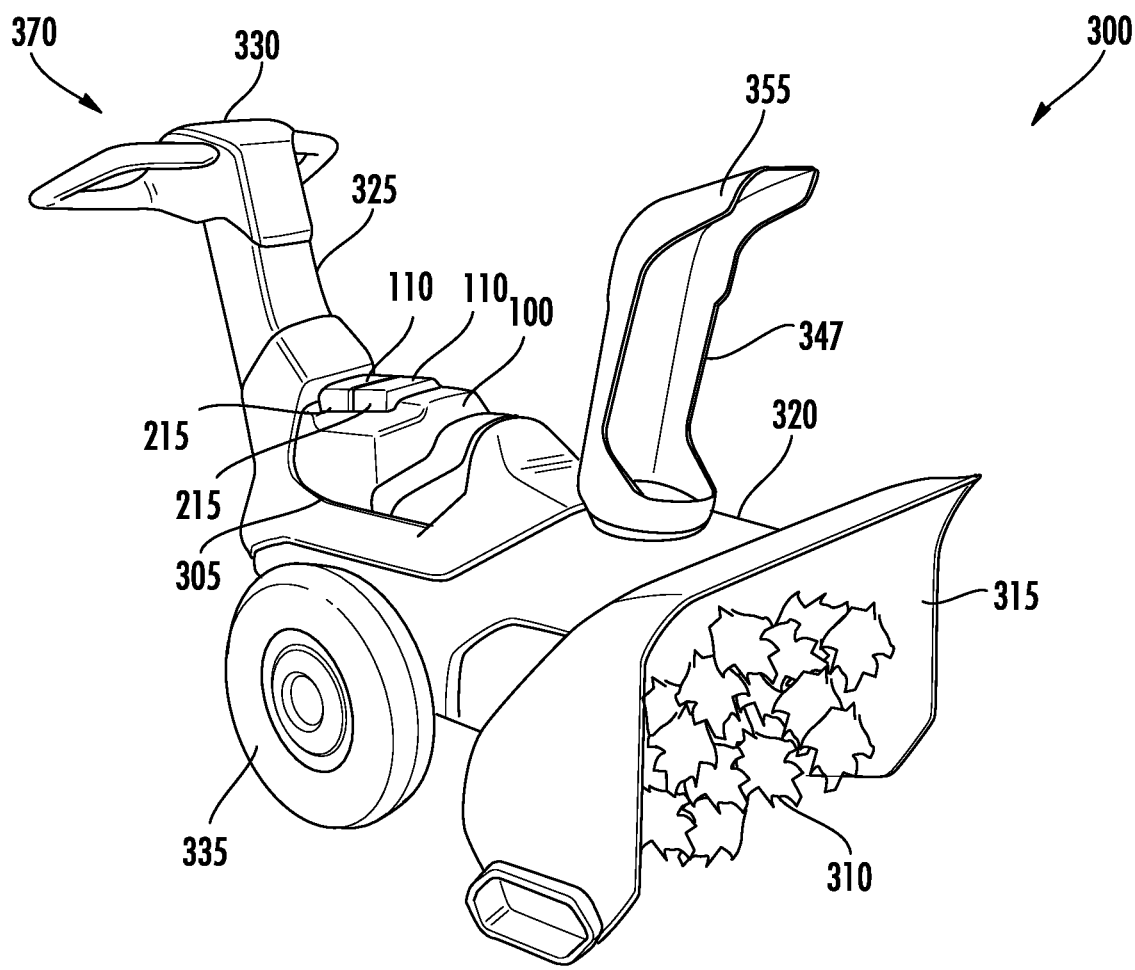
FIG. 7 is a perspective view of a snow thrower.

FIG. 7 illustrates a snow thrower 300 according to an exemplary embodiment. The snow thrower 300 includes an electric powerhead 100 attached to a mounting location or platform 305 in a horizontal shaft orientation. The electric powerhead 100 includes two battery receptacles 215 and two removable batteries 110, thereby providing additional electrical energy for use by the electric powerhead 100 and any external electrical components connected to the electric powerhead 100. The snow thrower 300 includes an auger 310 positioned within an auger housing 315. The auger 310 is driven by the electric motor 105 of the electric powerhead 100 and is mechanically connected to the output shaft 130 (e.g., by a transmission). The auger housing 315 is located at the front of the body 320 of the snow thrower 300. A handle 325 extends from the rear of the body 320 and includes a user interface 330 for the user to grasp to direct the travel of the snow thrower 300. The snow thrower 300 also includes a pair of drive wheels 335. A chute 347 for directing snow output from the snow thrower 300 is rotatably connected to the body 320. A chute direction electric motor 350 rotates the chute 347 to a desired direction. A deflector 355 is connected to the chute 347 to control the angle at which snow is output from the chute 347. A deflector electric motor 360 may be provided to control the position of the deflector 355 relative to the chute 347. User hand controls 370 are provided at the user interface 330 to allow the user to provide operating commands (e.g., to activate or stop rotation of the auger 310, to activate or stop operation of the drive wheels 335, to set the maximum speed of the snow thrower, to control the direction of travel of the snow thrower, to control the position of the chute 347, to control the position of the deflector 355, and to control operation of other components of the snow thrower). Types of user hand controls include one or more switches, buttons, sliders, levers, dials, touch screens, positions sensors, torque sensors, force sensors, and other user input devices.

The user hand controls 370 are electrically coupled to the accessory interface via the power and communication ports so that the batteries 110 of the electric powerhead 100 provide power to these external electrical components and the controller 250 of the electric powerhead 100 is in communication with these external electrical components and can send and receive inputs and outputs to and from the external electrical components to control the electric motor 105, the battery 110, and the external electrical components (e.g., to control the speed and direction of rotation of the drive wheels 335 in response to a user input provided via the user hand controls 370). Communication may also be established wirelessly via a wireless transceiver to the external electrical components. Different embodiments of a snow thrower may include more, fewer, or different combinations of external electrical components. Other external electrical components include electric motor driven tillers, blowers, etc.

In some embodiments, at least a portion of the user hand controls, referred to as on-board controls, are positioned on the housing 115 of the powerhead 100. When the user hand controls 370 positioned remote from the housing 115 (as described above) are plugged into the accessory interface, the controller 250 overrides inputs received from the on-board controls and allows the remote user hand controls 370 to provide the control inputs to the controller 250 for operating the powerhead 100.

Figure 8:
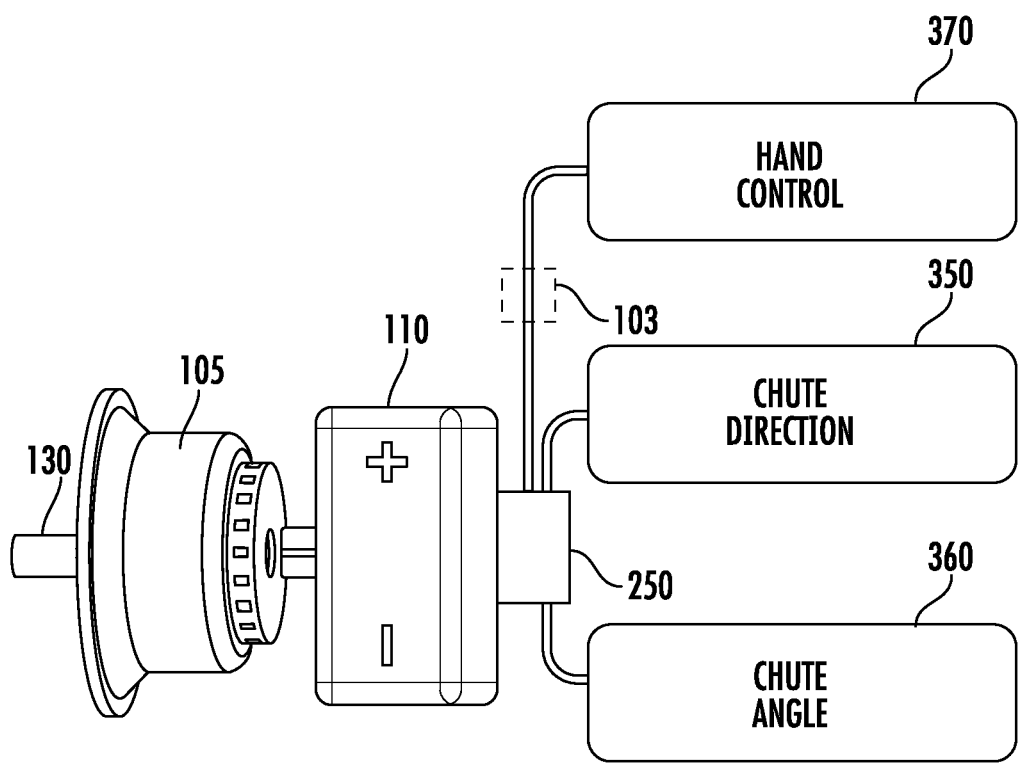
FIG. 8 is a schematic view of a control system of an electric powerhead, according to an exemplary embodiment.

In some embodiments, as shown in FIG. 8, a run sensor 103 is included with the electric powerhead 100. The run sensor 103 is configured to detect when an implement on outdoor power equipment is in a ready-to-run condition. As such, the run sensor 103 is communicably and operatively coupled to the controller 250 and to remote user controls (e.g., user controls 370). Depending on the type of outdoor power equipment with which the powerhead 100 is used, the run sensor 103 can take different forms. For example, the run sensor 103 may be a switch configured to detect the state (e.g., engaged or disengaged) of a brake or clutch (e.g., for a lawn mower), a switch configured to detect operator presence in the operating position (e.g., a hand-actuated switch on a handle), an enable fob or key configured to allow the electric motor 105 to start when actuated or present and prevent the electric motor 105 from starting when not actuated or present, a switch configured to sense water or another fluid (e.g., a capacitive water detection sensor, a pressure sensor, a flow sensor) to ensure that a pump has sufficient fluid to operate safely (e.g., for a pressure washer or waste pump).

The controller 250 is configured to receive inputs associated with the run sensor 103. The controller 250 receives a ready-to-run signal from the run sensor 103. The electric motor 105 starts when upon receiving a ready-to-run signal from the run sensor 103 and upon receiving an additional start signal from the user interface (e.g., user controls 370). Additional information or control logic may also be configured to start the engine in combination with the status of the run sensor 103 and/or other factors.

The Appendix included with the U.S. Provisional Application No. 62/469,472, filed on Mar. 9, 2017 and incorporated herein by reference in its entirety, describes and illustrates various aspects of electric powerheads and related outdoor power equipment.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

As utilized herein, the terms "approximately," "about," "substantially," and similar terms are intended to have a broad meaning in harmony with the common and accepted usage by those of ordinary skill in the art of outdoor power equipment. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

What is claimed is:
1. An electric powerhead, comprising:
a plate including a shaft opening and a plurality of first openings arranged in a standard horizontal shaft engine mounting pattern;
a battery receptacle configured to receive a battery, the battery configured to be attachable and removable from the battery receptacle without the use of tools;

a base plate comprising a plurality of second openings arranged in a standard horizontal shaft engine support pattern; and an electric motor supported by the base plate, wherein the electric motor includes an output shaft that extends through the shaft opening of the plate and wherein the output shaft is configured to rotate about an axis of rotation;

wherein the base plate is configured to be fastened to a mounting surface and to separate the electric motor and the battery receptacle from the mounting surface.

2. The electric powerhead of claim 1, wherein the plurality of first openings comprises four openings.

3. The electric powerhead of claim 1, wherein the plurality of second openings comprises four openings.

4. The electric powerhead of claim 1, wherein a bottom surface of the base plate is spaced apart from the axis of rotation of the output shaft by a vertical distance equal to a standard horizontal shaft engine spacing.

5. The electric powerhead of claim 4, wherein the vertical distance is between 4.1 and 4.2 inches.

6. The electric powerhead of claim 1, wherein a diameter of the output shaft is equal to a standard small engine output shaft diameter.

7. The electric powerhead of claim 6, wherein the diameter of the output shaft is between 0.74 and 0.79 inches.

8. The electric powerhead of claim 1, wherein a length of the output shaft is equal to a standard small engine output shaft length.

9. The electric powerhead of claim 8, wherein the length of the output shaft is between 1.9 and 2.4 inches.

10. The electric powerhead of claim 1, wherein the battery is configured to provide electricity to the electric motor.

11. The electric powerhead of claim 10, further comprising a plurality of battery receptacles supported by the base plate, wherein the battery is configured to be removably attached to one of the plurality of battery receptacles.

12. Outdoor power equipment, comprising:
an electric powerhead comprising:
a plate including a shaft opening and a plurality of first openings arranged in a standard horizontal shaft engine mounting pattern;
a base plate comprising a plurality of second openings arranged in a standard horizontal shaft engine support pattern;
a battery receptacle;
an electric motor supported by the base plate, wherein the electric motor includes an output shaft that extends through the shaft opening of the plate and wherein the output shaft is configured to rotate about an axis of rotation; and
a battery configured to be removably attached to the battery receptacle without the use of tools to provide electricity to the electric motor;
wherein the base plate is configured to be fastened to a mounting surface and further configured to separate the electric motor and the battery receptacle from the mounting surface.

13. The outdoor power equipment of claim 12, wherein the plurality of first openings comprises four openings.

14. The outdoor power equipment of claim 12, wherein the plurality of second openings comprises four openings.

15. The outdoor power equipment of claim 12, wherein a bottom surface of the base plate is spaced apart from the axis of rotation of the output shaft by a vertical distance equal to a standard horizontal shaft engine spacing.

16. The outdoor power equipment of claim 15, wherein the vertical distance is between 4.1 and 4.2 inches.

17. The outdoor power equipment of claim 12, wherein a diameter of the output shaft is equal to a standard small engine output shaft diameter.

18. The outdoor power equipment of claim 17, wherein the diameter of the output shaft is between 0.74 and 0.79 inches.

* * * * *